(12) United States Patent
Parekh et al.

(10) Patent No.: US 7,625,445 B2
(45) Date of Patent: Dec. 1, 2009

(54) AGGREGATE FOR MAKING A MOLDED ARTICLE AND A METHOD OF MAKING THE AGGREGATE

(76) Inventors: Chirag Parekh, Bhavnagar Rajkot Highway, Navagam, Post.Vartej 364060, Gujarat (IN); Ashwin Parekh, Bhavnagar Rajkot Highway, Navagam, Post.Vartej 364060, Gujarat (IN)

(*) Notice: Subject to any disclaimer, the term of this patent is extended or adjusted under 35 U.S.C. 154(b) by 269 days.

(21) Appl. No.: 10/939,888

(22) Filed: Sep. 13, 2004

(65) Prior Publication Data

US 2005/0090597 A1    Apr. 28, 2005

(30) Foreign Application Priority Data

Oct. 28, 2003   (IN) .................. 1132/MUM/2003
Nov. 20, 2003   (IN) .................. 1197/MUM/2003

(51) Int. Cl.
*C08K 3/00*        (2006.01)
*C08K 3/34*        (2006.01)

(52) U.S. Cl. .............. 106/482; 106/489; 106/490; 106/491; 524/81; 524/560; 524/561; 524/847; 525/263; 525/298; 525/302; 525/330.3

(58) Field of Classification Search ............... 524/80, 524/81, 560, 561, 847; 106/482, 489, 490, 106/491; 525/263, 298, 302, 330.3
See application file for complete search history.

(56) References Cited

U.S. PATENT DOCUMENTS

| 6,451,910 | B1 * | 9/2002 | Koyanagi et al. | 524/854 |
| 6,664,314 | B1 * | 12/2003 | Hajek et al. | 523/218 |
| 6,726,970 | B2 * | 4/2004 | Schoela et al. | 428/35.7 |
| 6,936,643 | B1 * | 8/2005 | Joussen et al. | 523/171 |

FOREIGN PATENT DOCUMENTS

| WO | WO 9947594 | * | 9/1999 |
| WO | WO 0067992 | * | 11/2000 |
| WO | WO 0156784 | * | 8/2001 |

* cited by examiner

*Primary Examiner*—Kelechi C Egwim
(74) *Attorney, Agent, or Firm*—Charles A. Muserlian

(57) ABSTRACT

An aggregate for making a molded article and a method of making the aggregate is disclosed. The aggregate consists of an acrylate based resin matrix and anti abrasive particles chiefly quartz particles having a size of between 0.1 mm and 1.2 mm, at least 30 percent of the anti abrasive particles being broken particles having irregular shape with sharp edges silanized and non-silanized. The aggregate includes fine powders, cross linking agent and Peroxides. The molded article made from the aggregate has anti-abrasive properties and "look and feel" of natural material.

8 Claims, No Drawings

AGGREGATE FOR MAKING A MOLDED ARTICLE AND A METHOD OF MAKING THE AGGREGATE

The invention relates to a novel process for making an aggregate, an aggregate made from the process and to a process of molding articles there from.

Articles that can be made from the novel aggregate in accordance with this invention include fixtures such as kitchen molded articles bathroom basins, counters for kitchens, bathtubs, shower cubicle bases and the like and other articles of a decorative or utility nature such as tiles for wall cladding and flooring. The aggregate is such that not only is the final product abrasive resistant but it also has the appearance of natural stone.

The novel aggregate in accordance with this invention includes a curable resin matrix, which can be polymerized, and at least one anti abrasive. In accordance with one aspect of this invention there is provided a method of forming the novel aggregate and a method of molding an article in the process of aggregate development.

In the prior art, the use of a free-flowing mixture made from a solution of polymethyl methacrylate in methyl methacrylate and an filler material consisting of Silicon dioxide particles is known. In the prior art mixture, the proportion of filler amounts to 62% to 66% by weight, and quartz is used as an anti abrasives which is previously recrystallized in a furnace to cristo-balite and then ground up so the majority of the anti abrasives particles have a size of between 5 .mu.m and 50 .mu.m.

Articles made from this material are susceptibility to visible scratch marks or to unremovable stains on the visible side of the articles, they also have an artifical appearance.

Another aggregate known in the prior art essentially uses the same resin mix but a majority of mineral anti abrasives particles having a size of between approximately 0.1 mm and approximately 2 mm, and with the addition that the particles are required to have an unbroken grain shape, and constitute about 50% to 85% by weight, in particular, approximately 60% to 80% by weight, of the aggregate.

In the rest of this specification articles made from such a aggregates will be referred to as a molded article of the prior art.

This prior art aggregate and articles made therefrom suffer from several inherent defects, which include the following:

1. The aggregate and the articles made therefrom are significantly brittle, porous and have a relatively rough surface, particularly on the vertical walls, which in turn results in scale deposition on the articles in use made from the said aggregate. The use of mineral anti abrasives particles in significant quantities causes greater shrinking of resin for example, pure acrylic resin shrinks by 22%. Consequently, microscopic depressions are formed between the anti abrasives particles which are close to the surface which results in scale deposition of the articles made from the aggregate of the prior art.
2. The scale formed is difficult to clear.
3. Due to higher density of the base the weight of the article made from the aggregate is more and therefore:
(a) Transportation costs are relatively high
(b) Packing cost are high
(c) Breakage during transport is high on rough roads due to weight impact as well as cantilever action.
(d) The scoring resistance is not acceptable and even light pressures on the component results in visible scoring.
4. The tensile strength of the aggregate and of the article made there from is relatively low.
5. It has been experienced that articles made from the prior art aggregate suffer from the defect that there is a significant chance of damage to tap hole areas while tapping and because the resin is less in the socket and other areas required for clamping of the article, it results in poor griping of clamping screw in the socket.
6. The elasticity and resilience of the aggregate and the article made therefrom is relatively low, this not only results in bending of the article off a horizontal or vertical axis but even when bending is there then installation is hard, because straightening by tightening clamps is hard due to low resilience and less elasticity.
7. Due to a relatively lower quantity of resin by weight, bonding with solid particles within the aggregate is poor.
8. The surface is dull and because it is relatively rough there is a greater probability that there will be more penetration of external food and dirt particles.
9. Screwing of clamp is relatively time consuming and tedious and this also effect the life of the drill bit and screw bit.
10. The pressure vessel used as the apparatus for forming the aggregate is tedious to clean and this operation is more time consuming, since resin is less, viscosity of resin is also low.
11. Wearing of the mold is relatively significant, since a high percentage of solid particles, while mould filling cause more scratches polishing frequency of mold is high.
12. Operating range of viscosity is short under tropical conditions.
13. Machining tool life for example edge cutting tool, waste hole drilling tool, overflow-drilling tool is relatively less in the prior art articles because of the high anti abrasives content.
14. Cleaning of the articles is not easy.

This invention seeks to provide a novel aggregate which decreases the aforesaid drawbacks and additionally has improved scoring resistance properties and gives the final product a natural finish which has the 'look and feel' of granite, marble and other natural materials.

According to this invention there is provided a novel aggregate for making a molded article, said aggregate consisting of an acrylate based resin matrix constituting between 20 to 55 percent of the aggregate and anti abrasive particles between 45 to 80 percent of the aggregate, greater than 50 percent of the anti abrasives particles being quartz particles having a size of between 0.1 mm and 1.2 mm, at least 30 percent of the anti abrasive particles being broken particles having irregular shape with sharp edges, at least 60 percent of the anti abrasive particulate matter being silanized, 1 to 7 percent of the anti abrasive particles matter having particle size of less than 0.1 mm, a cross linking agent in the region of 0.5 to 4 percent of the aggregate; a internal lubricant not greater than 0.4 percent of the aggregate; and Peroxides approximately 0.2 to 1 percent of the aggregate.

Typically, the said resin matrix consists of 70 to 80 percent by weight of methyl methacrylate and 20 to 30 percent of polymethyl methacrylate.

Typically, the anti abrasive consists of at least 2.0 percent of silica powder.

In accordance with a preferred embodiment of this invention, the anti abrasive particles consists of particles selected from a group consisting of crushed quartz colored or uncolored river sand, coloured or uncolored sea sand, emery, carborandum, powdered agate, zirconium sands, metal powders including alumina powder, copper and brass powders or other precious, semi precious and non precious metals and naturally occurring crystalline material in particulate form, and natural silicates.

Typically, the cross linking agent is Trimetholol propane trimethacrylate.

A preferred composition of the aggregate according to this invention consists of resin matrix 33% of total aggregate, Anti abrasive is 64.43% of total aggregate, Silica Powder 2.0% of total aggregate, Peroxides 0.57% of total aggregate.

Typically, the peroxide is at least one from a group of peroxides consisting of di lauryl peroxide, tert-butylperbenzoate, bis-4-t-butyl cyclo hexyl peroxidicarbonate.

In accordance with another aspect of this invention there is provided a method of making an aggregate for making a molded article comprising the steps of making a syrup preparation for an acrylate resin matrix by mixing 70 to 80 percent by weight of methyl methacrylate and 20 to 30 percent of polymethyl methacrylate in a mixing vessel at temperatures between 30 to 35 degrees C. to form a resin matrix being 20 to 55 percent of the aggreagate, adding a cross linking agent such as Trimetholol propane trimethacrylate, an internal lubricant such as stearic acid to the said resin matrix mixture at a temperature between 20 to 25 degrees C. and mixing the ingredients, adding anti abrasive particles between 45 to 80 percent of the aggregate, greater than 50 percent of the anti abrasives particles being quartz particles having a size of between 0.1 mm and 1.2 mm, at least 30 percent of the anti abrasive particles being broken particles having irregular shape with sharp edges, at least 60 percent of the anti abrasive particulate matter being silanized, 1 to 7 percent of the anti abrasive particles matter having particle size of less than 0.1 mm, gradually and under continuous stirring, adding peroxide agent to the mixture to obtain the said aggregate for molding articles.

Typically, in the step of making a syrup preparation, polymethyl methacrylate is added gradually to the methyl methacrylate under continuous stirring and controlled temperature.

The method of making the aggregate of the invention is as follows:

The method involves as an initial step Syrup Preparation in a Mixing Vessel. Typical ingredients in the syrup include
  (a) MMA—72% of total MMA+PMMA
  (b) PMMA—28% of total syrup The following additives may advantageously be added to the syrup in accordance with the method of this invention:
  Addition of Cross Linking Agent in Syrup—2% of MMA+PMMA
  Addition of Internal Demoulding Agent/Lubricating Agent in Syrup—0.2% of MMA+PMMA A typical aggregate preparation in accordance with this invention includes the following ingredients:
  Base Batch Preparation in small mixing pressure vessels
  (a) Syrup—53.98% of total charge
  (b) Anti abrasive—43.18% of total charge
  (c) Silica Powder—0.98% of total charge (for better bonding larger particles of anti abrasive helps in decreasing pin holes & pitting)
  (d) Peroxides as curing agents—1.41%

A typical Process in accordance with this invention can be exemplified as follows:
1. Syrup Preparation
   MMA is introduced in a mixing vessel. PMMA in powder/granule form is added gradually with continuous stirring at around 240 r.p.m. Temperature is maintained at about 40° C. during syrup preparation. Mixing time is 6 Hrs. After mixing the syrup is required to stand and the temperature is maintained at 20 to 25° C.
2. After syrup preparation is over and temperature 20-25° C. is attained, cross-linking agent is added and stirring for 1 Hr is done.
3. Then, Internal Demolding/Lubricating Agent (Stearic Acid) is added and stirred for another 1 Hr.
4. Base Batch Preparation:
   Depending on various colours required in the article to be formed the batch preparation is done in pressure vessels, as follows:
   (a) Syrup with Cross Linking Agent & Demolding Agent is taken in pressure vessel
   (b) Then anti abrasives are added in pressure vessel and mixed.
   (c) Silica Powder is then added and mixed
   (d) Then peroxides are added
       Total mixing time is 1 Hr and during above operation cooling water at 15 to 20° C. is continuously circulated in the jacket. After this vacuum of 600 mm is applied for 15 minutes along with mixing.
5. Then pressure vessel is moved to casting bay, where air pressure of 5 to 6 kg/Cm$^2$ is applied for transferring the material from vessel to mold.
6. After transferring the material to mold the heating of molds is done at a predetermined set cycle.

| Top | | | | | | | | |
|---|---|---|---|---|---|---|---|---|
| Time | 0 | 3 | 7 | 11 | 15 | 20 | 22 | 24 | 25 |
| Temp. | 00 | 15 | 30 | 60 | 100 | 100 | 60 | 60 | End |
| Bottom | | | | | | | | |
| Time | | 0 | 1 | 26 | | | | |
| Temp | | 20 | 90 | 110 | End | | | |

Filling is done at 20° C. Pressure of 6 Kg/Cm to 8 Kg is applied to Mold after filling. This is continued till temp. Cycle is over.
7. After cycle is completed air pressure is released and clamps opened. Then top-ejecting air is applied to release top mold sticking to the article. It is then lifted and a bottom air ejector is applied to separate article from the bottom mold. During above period temperature of bottom mold is kept at 60-80° C. for easy release.
8. After casting the article is clamped on a fixture till it is cooled to room temp
   After cooling is complete the articles declamped from fixture A variety of thixotropic agents can be applied to the mixture; with acrylic resin, a portion of polymethyl methacrylate dissolved in methyl methacrylate works as a thixotropic agent, other known and unknown substances such as, for example, fumed silica can be used.

The anti abrasives can be particulate material of the mineral or metal type of particle size predominately in the 0.03 to 0.8 mm range and the total content of the anti abrasives should not exceed 80 percent of the aggregate. Thus, it is possible to achieve a substantial improvement over the prior art aggregate by choosing the composition of an article of the kind such that the majority of the mineral or metal anti abrasives particles have a size preferably, of between approximately 0.03 mm and approximately 1.2 mm, that the anti abrasives constitutes less than 80% by weight, of the aggregate compound, and in the areas of the article subject to severe stress during use, the packing density of the anti abrasives particles, i.e., the anti abrasives proportion of the aggregate is greater on the working surface of the article.

A proportion of the anti abrasive particles are silanized by any known silanization process. Silanization is a process which involves the chemical conversion of the hydroxyl groups, which often act as adsorption sites on silica or glass stationary phases, with silane coupling agents to give the inactive —O—SiR$_3$ grouping. Silanization neutralizes surface charges, eliminating non-specific binding. The broken particles have irregular peripheral edges some of which are sharp. This increases the surface area of the particles effectively and at the same time increases the bond between the particles and the resin matrix. Silanization however dulls the particle surface and therefore for the natural look and feel are certain number of the particles need to be unsilanized and unbroken.

Viscosity of the mixture to be introduced into the mold depends on the ambient temperature and syrup ingredients. It is preferred that the anti abrasives particles settle towards the bottom wall of the mold cavity. The mold cavity may be cooled to approximately 20 to 25 degrees C. whilst introducing the mixture so that it remains thixotropic before and while it is introduced, but, at the same time, permits the anti abrasives particles to settle in the mould before curing since the viscosity decreases as a result of the temperature. Once the polymerization process starts, the level of viscosity increases drastically, thus terminating the sedimentation of the anti abrasives.

The anti abrasive particles may be advantageously river sand coloured or uncoloured, sea sand, emery, carborandum, powdered agate, zirconium sands, metal powders including alumina powder, copper and brass powders or other precious, semi precious and non precious metals and naturally occurring crystalline material in particulate form.

In accordance with a preferred embodiment of this invention it is desirable that the anti abrasives particles follow a grading curve with the majority of the anti abrasives particles having a size of between approximately 0.03 mm and approximately 1.2 mm and still advantageously, between 0.3 and 0.7 mm.

In use, articles according to the invention in which the resin base consists of polymethyl methacrylate are advantageous; however, polyesters, polyurethanes and epoxy resins are also useable.

Advantageously, in the aggregate for making a molded article, filler particles may be included in predetermined proportions to achieve different effects. Such fillers are selected from a group comprising Inorganic particles of: Al(OH)$_3$, Antimony Trioxide, Magnesium carbonate, Metal powders, such as of aluminum, Bronze, Copper, Silver,; Calcium carbonate, Slate, Zircon, Agate, Vermiculite, Granite, Nanoclay, Marble, Wallastonite, Limestone, Bentonite, Gypsum, Mica, and/or ORGANIC particles such as Nylon fibres, carbon/graphite fibres, polyester fibres, Jute Fibers, Woven Wovenpolypropylene, Kevlar, PVDF, Banana fiber, Coconut fiber, Vegetable fiber, GLASS FILLERS: Fiber glass, Solid glass spheres, Hollow glass spheres, Glass flakes, and OTHERS: Wood flour/granules, Flyash, and Lignite in the range of 1 to 5% by mass of the aggregate.

Articles made from the novel aggregate envisaged in accordance with this invention have the following among other advantages:

The articles are less Brittle and less Porous. The scale deposition is less due to less porosity and decreased roughness. Scale formed is easily removed. Vertical walls are smooth and shining which gives excellent appearance and scale deposition is not there. Because of less density of base, weight of article is less and so transport cost will be less and packing cost will be low. Further, breakage during transport will be low on rough roads due to wt. impact on bottom of article as well as because of the fact that cantilever action decreases causing less breakage. The tensile strength is more and further chances of damage to tap hole area while tapping are decreased. There is more resin in the socket, so better griping of clamping screw in socket. There is more elasticity, hence even when bending is there then installation is easy, because straightening by tightening clamps is easy due to more elasticity. Due to high content of resin, bonding with solid particles is good. The surface being more smooth penetration of food, dirt particles will be less. Screwing of clamp is less time consuming and life of drill bit and screw bit (tools for clamp screwing) is increased. The over all product is more hygienic. It has been proposed that by addition of a bioactive quantities of an antifungal agent such as griseofulvin it is possible to prevent the growth of fungii and other cultures on the articles made from this aggregate.

Pressure vessel cleaning is easy since resin is more and its viscosity is also high. The wearing of mold is less as compared to existing process, since higher resin percentage develop less scratches. And so polishing frequency of mold is decreased. Operating range of viscosity is more under tropical conditions. Machining tool life e.g. Edge cutting tool, waste hole drilling tool overflow drilling tool will be more in the article according to this invention due to higher resin content. Article made from the aggregate in accordance with this invention can be cleaned easily.

Following defect are decreased in the article in manufacturing:
(a) Pin holes(b) Pitting (c)white patch marks (d) Flow marks, Hence rework and rejection due to above defects will decrease The articles made according to the invention virtually never get stained during use when they come into contact with dyes, fats or oils, alkaline solutions, acids and the like. Moreover, no so-called water whitening effect occurs, even in the case of alternating exposure to hot and cold water. This feature, in addition to the fact that the articles according to the invention almost never get stained, applies even in those cases where the resin layer coating the anti abrasives particles close to the surface has been partially or completely removed by abrasion on the working surface area.

The invention will now be described with reference to the accompanying examples:

EXAMPLE 1

First syrup preparation was done as follows:

In a mixing vessel of Stainless Steel 304 capacity 80 lit. 35.25 kg of MMA was taken. Then 13.70 kgs of PMMA was added gradually in 15 minutes. The temperature was maintained at 30-35° C. by circulating cooling water in jacket. Through mixing was done to dissolve PMMA. The Speed of the mixture was maintained at 70 rpm. Total mixing time was 6 hrs.

After mixing temperature was maintained at 20-25° C. circulating chilled water in jacket. Then 0.975 kgs of cross-linking agent was added to above syrup and stirred at 70 rpm for 1 hr. Temperature was continuously maintained at 20.25° C. Then internal demolding agent 0.075 kg of stearic acid was added. It was mixed for Hr. in above syrup at 70-rpm speed. Temperature was maintained at 20-25° C.

Then 35.399 kgs matrix batch was prepared as follows for making the aggregate 11.795 kgs of above syrup with cross linking and demolding/lubricating agent was taken in pressure vessel provided with stirrer for mixing and jacket for maintaining temperature at 15-20° C. by circulating chilled water. Capacity of pressure vessel was 60 lit. 0.4 kgs. Of peroxides, was added in the pressure vessel and mixed with syrup for 10 min. at 70 rpm. Speed of stirrer. 23.404 kgs of mixed anti abrasive particles of different colors with 95% particle size between 0.06 mm. to 0.8 mm. was added gradually in 10 min. Through the hopper. The speed of stirring while addition of anti abrasives was maintained at 70 rpm. Thereafter it was increased to 140 rpm. Then 0.35 kgs of quartz powder (240 mesh) were added. Then for thorough mixing speed was maintained for 10 min. The above aggregate thus prepared was then used for casting product as follows:

Preparation of Mold: Mold was first cleaned by blowing air. Then top mold was brought down hydrostatically and allowed to rest on bottom mold. Top and bottom molds were hold together by clamps operated pneumatically. Thickness clamps were applied to maintain thickness of molded article. Thickness setting clamps were applied only after applying pressure (4 kg/cm2) from bottom to bottom mold since top mold is held firm with bottom mold. The pressure causes bottom mold to rise and then when desired thickness is achieved the thickness clamps are applied for maintaining this thickness. After thickness-setting clamps are applied the pressure from bottom is released.

Molding operation: Pressure vessel with the aggregate was taken to the casting bag. It was then connected to the mold with flexible pipe. The mold was then titled vertically. Then air pressure of 8 kg/cm2 was applied in pressure vessel for transferring the aggregate to mold. When the mold was being filled with aggregate air came out from venting valve/outlet valve of mold. The moment aggregate started flowing out from venting/outlet valve, the inlet and outlet valves of mold were closed. Also the outlet valve of pressure vessel was closed. Air supply to pressure vessel was stopped. And mold was tilted back to horizontal position. The air connection to pressure vessel was disconnected, and also flexible pipe connected to mold and pressure vessel disconnected. While filling the mold the temperature of top mold was 20° C. and bottom mold was 30° C. Then following temperature cycle was maintained in top and bottom mold through control panel. This temperature cycle was preset in control panel for maintaining temperature in top and bottom molds as desired.

Top mold temperature cycle.

| Time     | 0  | 3  | 7  | 11 | 15  | 20  | 22 | 25 |
|----------|----|----|----|----|-----|-----|----|----|
| Set Temp | 15 | 15 | 30 | 60 | 100 | 100 | 60 | 60 |
| Actual   | 16 | 17 | 32 | 62 | 98  | 102 | 62 | 58 |

Bottom mold temperature cycle

| Time, min  | 0  | 1   | 31  |     |
|------------|----|-----|-----|-----|
| Set Temp   | 30 | 100 | 100 |     |
| Actual Tem | 28 | 80  | 102 | end |

Air pressure of 8 kg cm2 was applied maintained (at bottom of mold) throughout this temperature cycle.

On completion of temp cycle air pressure applied at bottom of mold was released. Then mold clamps were opened. And top air ejector was applied to released top mold sticking to molded article. Top mold was then lifted and bottom air ejectors were applied to lift molded article from mold. Slight hammering with plastic hammer was done on material above ejector points. During demolding temperature of bottom mold was kept of 80° C.

After demolding the molded article was put on fixture where pressure was applied through a clamp. Reverse bending was maintained till the molded article cooled to room temperature.

Machining operation were carried out on this molded article next day. First the waste hole drilling was done on drill machine with diamond tools. Then the side flashes were removed. For this the molded article was clamped on flat wooden fixture and then machined on router machine with help of diamond cutting tool. Drilling and clamping of nylon clamps on socket of molded article was then done.

EXAMPLE 2

First syrup preparation was done as follows:

In a mixing vessel of Stainless Steel 304 capacity 80 lit. 34.22 kg of MMA was taken. Then 18.43 kgs of PMMA was added gradually in 15 minutes. The temperature was maintained at 30-35° C. by circulating cooling water in jacket. Thorough mixing was done to dissolve PMMA. The Speed of the mixture was maintained at 70 rpm. Total mixing time was 6 hrs.

After mixing temperature was maintained at 20-25° C. circulating chilled water in jacket. Then 0.8 kgs of cross-linking agent was added to above syrup and stirred at 70 rpm for 1 hr. Temperature was continuously maintained at 20.25° C. Then internal demolding agent 0.1 kg of stearic acid was added. It was mixed for 1 Hr. in above syrup at 70-rpm speed. Temperature was maintained at 20-25° C.

Then 35.399 kgs matrix batch was prepared as follows for making the aggregate 11.795 kgs of above syrup with cross linking and demolding/lubricating agent was taken in pressure vessel provided with stirrer for mixing and jacket for maintaining temperature at 15-20° C. by circulating chilled water. Capacity of pressure vessel was 60 lit. 0.4 kgs of peroxides, was added in the pressure vessel and mixed with syrup for 10 min. at 30 rpm. Speed of stirrer. 22.0 kgs of mixed anti abrasive particles of different colors with 95% particle size between 0.063 mm. to 0.8 mm. was added gradually in 10 min. through the hopper. The speed of stirring while addition of anti abrasives was maintained at 70 rpm. Thereafter it was increased to 140 rpm. Then 0.5 kgs of powder silica(240 mesh) and 0.3 kgs of fumed silica was added. Then for through mixing speed was maintained for 10 min. The above aggregate thus prepared was then used for casting product as follows:

Preparation of Mold: Mold was first cleaned by blowing air. Then top mold was brought down hydrostatically and allowed to rest on bottom mold. Top and bottom molds were hold together by clamps operated pneumatically. Thickness clamps were applied to maintain thickness of molded article. Thickness setting clamps were applied only after applying pressure (4 kg/cm2) from bottom to bottom mold since top mold is held firm with bottom mold. The pressure causes bottom mold to rise and then when desired thickness is achieved the thickness clamps are applied for maintaining this thickness. After thickness setting clamps were applied the pressure from bottom was released.

Molding operation: Pressure vessel with the aggregate was taken to the casting bag. It was then connected to the mold with flexible pipe. The mold was then titled vertically. Then air pressure of 6 kg/cm2 was applied in pressure vessel for transferring the aggregate to mold. When the mold was being filled with aggregate air came out from venting valve/outlet valve of mold. The moment aggregate started flowing out from venting/outlet valve, the inlet and outlet valves of mold were closed. Also the outlet valve of pressure vessel was closed. Air supply to pressure vessel was stopped. And mold was tilted back to horizontal position. The air connection to pressure vessel was disconnected, and also flexible pipe connected to mold and pressure vessel disconnected. While filling the mold the temperature of top mold was 20° C. and bottom mold was 30° C. Then following temperature cycle was maintained in top and bottom mold through control panel. This temperature cycle was preset in control panel for maintaining temperature in top and bottom molds as desired.

Top mold temperature cycle. [Temperature was in degrees celsius]

| Time | 0 | 3 | 7 | 11 | 15 | 18 | 23 | 28 | 31 |
|---|---|---|---|---|---|---|---|---|---|
| Set Temp | 20 | 25 | 35 | 40 | 60 | 80 | 100 | 100 | 60 |
| Actual | 20 | 24 | 36 | 42 | 62 | 82 | 102 | 102 | 62 |

Bottom mold temperature cycle

| Time, min | 0 | 1 | 31 | |
|---|---|---|---|---|
| Set Temp | 30 | 100 | 100 | |
| Actual Tem | 28 | 80 | 102 | end |

Air pressure of 6 kg cm2 was applied maintained (at bottom of mold) throughout this temperature cycle.

On completion of temp cycle air pressure applied at bottom of mold was released. Then mold clamps were opened. And top air ejector was applied to released top mold sticking to molded article. Top mold was then lifted and bottom air ejectors were applied to lift molded article from mold. Slight hammering with plastic hammer was done on material above ejector points. During demolding temperature of bottom mold was kept of 80° C.

After demolding the molded article was put on fixture where pressure was applied through a clamp. Reverse bending of 27 mm was maintained till the molded article cooled to room temperature.

Machining operation were carried out on this molded article next day. First the waste hole drilling was done on drill machine with diamond tools. Then the side flashes were removed. For this the molded article was clamped on flat wooden fixture and then machined on router machine with help of diamond cutting tool.

Drilling and clamping of nylon clamps on socket of molded article was then done.

EXAMPLE 3

Another excellent aggregate was made with a Resin matrix 33.32%, and abrasive particles with the following make up: Broken silanised anti abrasive particles 19.66%, Broken unsilanised Anti abrasive particles 13.11%, Broken unsilanised Quartz powder 1.97%, Unbroken Silanised Anti abrasive, 31.37% and peroxide 0.56%

EXAMPLE 4

Another excellent aggregate was made with a Resin matrix 33.32% Broken Silanised Anti abrasive particles 21.66%, Broken Unsilanised Anti abrasive particles 11.11%, Broken Unsilanised Quartz powder 1.97%, Unbroken Silanised Anti abrasive particles 31.37% Peroxide 0.56%.

EXAMPLE 5

Another excellent aggregate was made with a Resin matrix 30.21%, Broken Silanised Anti abrasive particles 25.85%, Broken Unsilanised Anti abrasive particles 7.78%, Broken Unsilanised Quartz powder 3.05%, Unbroken Silanised Anti abrasive particles 28.41%, Peroxide 0.56%, Pigments 4.14%.

EXAMPLE 6

Another excellent aggregate was made with a Resin matrix 30.21%, Broken Silanised Anti abrasive particles 20.85%, Broken Unsilanised Anti abrasive particles 7.78%, Broken Unsilanised Quartz powder 3.05%, Unbroken Silanised Anti abrasive particles 28.41%, Peroxide 0.56%, Pigments 4.14%, glass fibers 1%.

EXAMPLE 7

Another excellent aggregate was made with a Resin matrix 30%, Broken Silanised Anti abrasive particles 25.85%, Broken Unsilanised Anti abrasive particles 7.78%, Broken Unsilanised Quartz powder 3.05%, Unbroken Silanised Anti abrasive particles 22.41%, Peroxide 0.5%, Pigments 4.2%, glass fibers 1% and glass beads 5%

EXAMPLE 8

Another excellent aggregate was made with a Resin matrix 30%, Broken Silanised Anti abrasive particles 25.85%, Broken Unsilanised Anti abrasive particles 7.78%, Unbroken Silanised Anti abrasive particles 22.41%, Peroxide 0.56%, Pigments 4.2%, wallastonite 3.05% and glass beads 5%.

EXAMPLE 9

Another excellent aggregate was made with a Resin matrix 32%, Broken Silanized Anti abrasive particles 22.85%, Broken Unsilanized Anti abrasive particles 5.50%, Broken Unsilanized Quartz powder 3.05%,Unbroken Silanised Anti abrasive particles 24.41%, glass fibers 2.00%, Peroxide 0.56%, Pigments 5%, recycled material 5%.

EXAMPLE 10

Another excellent aggregate was made with a Resin matrix 30.21%, Broken Silanized Anti abrasive particles 25.85%, Broken Unsilanized Anti abrasive particles 5%, Broken Unsilanized Quartz powder 1.27%,Unbroken Silanised Anti abrasive particles 22.41%, Peroxide 0.56%, Pigments 3.5%, ATH 5%, mica chips 2.9%, mica powder 1.3%

EXAMPLE 11

Another excellent aggregate was made with a Resin matrix 30.21%, Broken Silanized Anti abrasive particles 25.82%, Broken Unsilanized Anti abrasive particles 2.70%, Broken Unsilanized Quartz powder 4%,Unbroken Silanised Anti abrasive particles 28.11%, Peroxide 0.56%, Pigments 3.6%, metal powders 1.80%, mica powder 0.5%

EXAMPLE 12

Another excellent aggregate was made with a Resin matrix 30%, Broken Silanized Anti abrasive particles 30.48%, Broken Unsilanized Anti abrasive particles 4.24%, Broken Unsilanized Quartz powder 1.5%,Unbroken Silanised Anti abrasive particles 29.40%, Peroxide 0.48%, Pigments 1.6%, metal powders 1.80%, mica powder 0.5%

EXAMPLE 14

Another excellent aggregate was made with a Resin matrix 30%, Broken Silanized Anti abrasive particles 30.48%, Broken Unsilanized Anti abrasive particles 4%, Broken Unsilanized Quartz powder 2%,Unbroken Silanised Anti abrasive particles 29.49%, Peroxide 0.48%, Pigments 2.1%, metal powders 1.80%, mica powder 1.45%

EXAMPLE 15

Another excellent aggregate was made with a Resin matrix 30.21%, Broken Silanized Anti abrasive particles 25.85%, Broken Unsilanized Anti abrasive particles 2.7%, Unbroken Silanised Anti abrasive particles 28.41%, Peroxide 0.56%, Agate powder 12.59%, glass beads 5%

Articles made in accordance with examples 1 to 15 were taken up for Inspection:

On completion of all operations the molded article was inspected for visual defects. Following were the observations:

No pin holes were observed on show face.

No white patch marks were observed on show face.

No flow mark i.e. segregation of aggregate was present on showface. No pitting was observed on show face.

Test for scratch resistance [scoring]

Test Method:
1. SS 304 bar of 12 mm. Diameter is fitted on the chuck of the lathe.
2. The end of bar is tapered at 30 degree into fine point of 0.25 mm. Diameter
3. The sample piece on which scoring test is to be done is fitted on the tool post of lathe (sample size 50 mm X mm). Surface of sample piece has to be at perfect right angles to SS 304 bar point
4. Pressure gauge is fixed on the saddle of the lathe bed. Pressure gauge is contacted with tool post for measuring the pressure applied on sample piece through SS 304 bar point 5. SS 304 bar point is touched with surface of sample piece ie. At 0 pressure.
6. Cross slide is moved at 0.3 mt./min rate cross wise.
7. Pressure is applied on sample piece against SS 304 bar point by moving saddle.
8. Gradually pressure is increased starting from zero at intervals of 10 gm/cm2.
9. The pressure at which scratch is observed is recorded as point of appearance of scratch on surface.

The test results are shown in the following tables.

CONCLUSION

Results show that scratch resistant properties of articles molded from the aggregate of this invention are better than that of articles molded in the prior art.

Article Surface Drying Test

Operating conditions:—
1. Room temperature—24° C.
2. Ventilation—Not provided
3. Article Inclination angle—11°

Procedure
1. tap water is poured on the article
2. A thin film of water is made with the help of cotton cloth
3. The film is allowed to dry down and the drying time is noted with the help of a stop watch.

Observations:—

| | DRYING TIME (SEC) | |
|---|---|---|
| SR # | Article with aggregate Of present invention | with prior art |
| 1 | 228.10 | 367.00 |
| 2 | 258.68 | 368.72 |
| 3 | 230.33 | 395.75 |
| 4 | 275.88 | 358.22 |
| Average drying time | 248.24 | 372.42 |

The test shows that the articles made with the aggregate of the present invention dry significantly quicker than the articles made with the aggregate of the prior art.

Pot Drop Test Results

Test method:—article is mounted on the fixture It is supported throughout the edges. Weight of 2.0 kg is dropped from various heights on the article.

Article made Aggregate of this invention—

Article Wt:—16.450 kg (thickness near breakage area—9.30 mm)

Test Result 1—

| SR NO | Height from bottom of the bowl to point weight is dropped mm | Result |
|---|---|---|
| 1 | 200 | No effect |
| 2 | 300 | No effect |
| 3 | 500 | No effect |
| 4 | 600 | No effect |
| 5 | 700 | Crack observed |

Prior Art:—

Article wt:—19.33 kgs (Thickness near breakage area—11.200 mm)

Test Result 2:

| SR NO | Height from bottom of the bowl to point weight is dropped mm | Result |
|---|---|---|
| 1 | 200 | No effect |
| 2 | 300 | No effect |
| 3 | 400 | No effect |
| 4 | 500 | No effect |
| 5 | 600 | No effect |
| 6 | 700 | Crack observed |

Result: - In Pot test 1 article made with the aggregate of this invention (9.30 mm thickness) broke at 700 mm height and in test 2 article (11.2 mm thickness) also broke at 700 mm when weight of 2 kgs is dropped. Thus results showed that the article made of the aggregate of the present invention is more resistance to breakage since article of prior art breaks at same load and height but has 20% greater thickness.

Stain Test Report

Test method;—
1. Articles to be tested i.e. Article made with aggregate of present invention and made with aggregate of prior art are kept at room temperature (24° C.) conditions
2. Curcumin pigment with edible oil and with hot water are applied on the articles
3. Also hot black tea is poured on the article surface
4. All these applied things are allowed to soak down (soaking time—16 hrs)
5. On drying they are cleaned with tap water and cotton cloth without using any household cleaning agents
6. The result observed after cleaning are as mentioned below—

Test Results:—

| Substance applied on article surface | Article made with aggregate of present invention | Article made with aggregate of prior art |
|---|---|---|
| Curcumin pigment with oil | Stains removed | Slight stains remain |
| Curcumin pigment with hot water | Stain removed | Very mild stains remain |
| Hot black tea | Very mild stains remain | Dark stains remain |

Scoring Test Report

Test Method:—
1. $ 304 bar of 12 mm. Diameter is fitted on the chuck of the lathe
2. The end of bar is tapered at 30 into fine point of 0.25 mm. Diameter
3. Articles to be tested i.e. Article made with aggregate of present invention and made with aggregate of prior art are selected
4. The sample piece on which scoring test is to be done is fitted on the tool post of lathe (sample size 500 mm*30 mm). Total surface of sample piece has to be perfect right angles to $ 304 bar point
5. Pressure gauge is fixed on the saddle of the lathe bed. Pressure gauge is contacted with tool post for measuring the pressure applied on sample through $ 304 point
6. $ 304 bar point is touched with surface of sample piece ie at 0 pressure
7. Cross slide is moved at 0.3 mt/min rate cross wise to the bar
8. Pressure is applied on sample piece against $304 bar point by moving saddle
9. Gradually pressure was increased starting from zero at intervals of 1 gm/cm$^2$
10. The pressure at which scratch was observed is recorded on point of appearance of scratch on surface.

TEST RESULT

| Pressure applied (gm/cm$^2$) | Article with aggregate of present invention | Article with prior art |
|---|---|---|
| 10 | No visible scratch | No visible scratch |
| 20 | No visible scratch | No visible scratch |
| 30 | No visible scratch | Scratch observed |
| 40 | Scratch observed | — |
| 50 | — | — |
| 60 | — | — |

Results: - in article with prior art scratches are observed at 30 gm/cm$^2$ pressure. In article with aggregate of present invention scratches are observed at 40 g,/cm$^2$ pressure While considerable emphasis has been placed herein on the structures and structural interrelationships between the component parts of the preferred embodiments, it will be appreciated that many embodiments can be made and that many changes can be made in the preferred embodiments without departing from the principals of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

We claim:

1. An aggregate for making a molded article, said aggregate comprising an acrylate based resin matrix being 20 to 55 percent by weight of the aggregate and 45 to 80 percent by weight of anti-abrasive particles of the aggregate, wherein 50 to 80 percent of the anti-abrasive particles being quartz particles having a size of 0.1 mm and 1.2 mm, at least 30 to 65 percent or the anti-abrasive particles being broken particles having irregular shape with sharp edges, at least 60 to 90 percent of the anti-abrasive particulate mater being silanized, 1 to 7 percent of the anti-abrasive particles matter having particle size of less than 0.1 mm, trimetholol propane trimethacrylate as a cross linking agent of 0.5 to 4 percent of the aggregate; an internal lubricant not greater than 0.4 percent of the aggregate; and peroxides approximately 0.2 to 1 percent of the aggregate, all percentages being by weight, the weight being based on the weight of the aggregate.

2. An aggregate for making a molded article, as claimed in claim 1, wherein the said resin matrix comprises 70 to 80 percent by weight of methyl methacrylate and 20 to 30 percent of polymethyl methacrylate.

3. An aggregate for making a molded article, as claimed in claim 1, wherein the anti-abrasive particles comprise 2.0 percent to 4.0 percent of silica powder.

4. An aggregate for making a molded article, as claimed in claim 1, wherein the anti-abrasive particles are selected from the group consisting of crushed quartz, colored or uncolored river sand, colored or uncolored sea sand, carborandum, powdered agate, zirconium sands, metal powders including alumina powder, copper and brass powders or other precious, semi precious and non precious metals and naturally occurring crystalline material in particulate form, and natural silicates.

5. An aggregate for making a molded article, as claimed in claim 1, wherein the peroxide is at least one member selected from the group consisting of di lauryl peroxide, tert-butylperbenzoate and bis-4-t-butyl cyclo hexyl peroxidicarbonate.

6. An aggregate for making a molded article, as claimed in claim 1, wherein the aggregate includes filler particles selected from the group consisting of inorganic particles of Al(OH)$_3$, Antimony Trioxide, Magnesium carbonate, Metal powders of aluminum, Bronze, Copper, Silver, Calcium carbonate, Slate, Zircon, Agate, Vermiculite, Granite, Nanoclay, Marble, Wallastonite, Limestone, Bentonite, Gypsum, Mica and/or organic particles selected from, the group consisting of nylon fibers, carbon/graphite, polyester, Jute Fibers, Woven polypropylene, Kevlar, PVDF, Banana fiber, Coconut fiber, Vegetable fiber, Fiber glass, Solid glass spheres, Hollow glass spheres, Glass flakes, Wood flour/granules, Flyash, and Lignite in the range of 1 to 5% by mass of the aggregate.

7. A method of making an aggregate as claimed in claim 1, for making a molded article comprising the steps of making a syrup preparation for an acrylate resin matrix by mixing 70 to 80 percent by weight of methyl methacrylate and 20 to 30-percent by weight of polymethyl methacrylate in a mixing vessel at temperatures between 30 to 35° C. to form a resin matrix being 20 to 55 percent of the aggregate, adding a cross linking agent, an internal lubricant to the said resin matrix mixture at a temperature between 20 to 25° C. and mixing the ingredients, adding anti-abrasive particles between 45 and 80 percent of the aggregate, greater than 50 percent of the anti-abrasive particles being quartz particles having a size of 0.1 mm and 1.2 mm, at least 30 percent of the anti-abrasive particles being broken particles having irregular shape with sharp edges, at least 60 of the anti-abrasive particulate matter being silanized, 1 to 7 percent of the anti-abrasive particles matter having particle size of less than 0.1 mm, gradually and under continuous stirring, adding peroxide agent to the mixture to obtain the said aggregate for molding articles.

8. A method of making an aggregate as claimed in claim 7, for making a molded article, wherein in the step of making the resin matrix, polymethyl methacrylate is added gradually to the methyl methacrylate under continuous stirring and controlled temperature.

* * * * *